United States Patent Office 3,537,715
Patented Nov. 3, 1970

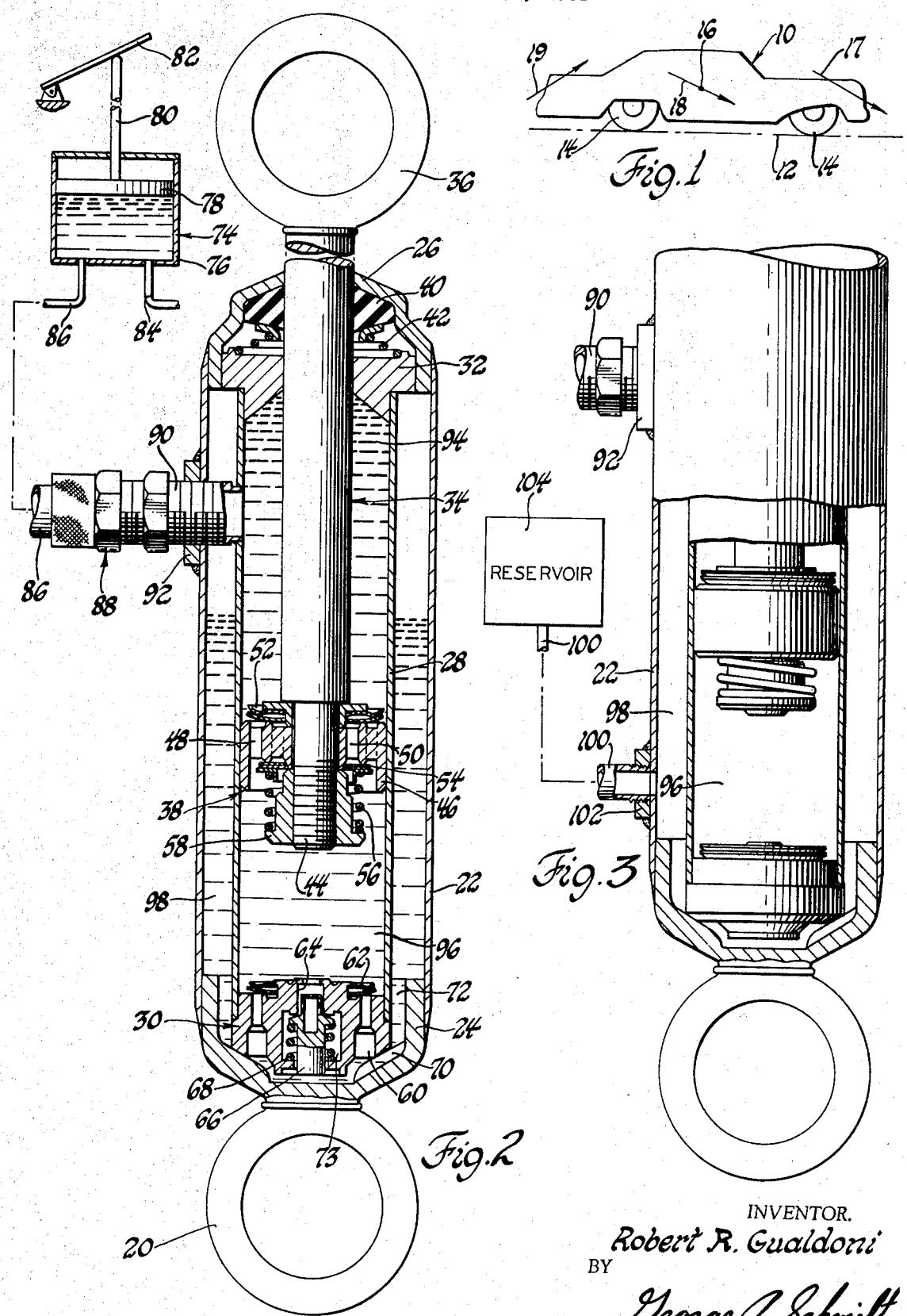

3,537,715
SNUBBING MEANS FOR AUTOMOTIVE VEHICLE
Robert R. Gualdoni, P.O. Box 113,
Mount Clemens, Mich. 48043
Filed Feb. 19, 1968, Ser. No. 706,558
Int. Cl. B60g 23/00
U.S. Cl. 280—6     5 Claims

ABSTRACT OF THE DISCLOSURE

Snubbing means for an automotive vehicle having a braking system, the snubbing means being operable to pull the rear of the sprung mass of the vehicle downwardly to counteract the dive of the forward end of the vehicle as braking is applied. The snubbing means includes a piston and cylinder arrangement, one of such elements being secured to the sprung mass of the vehicle and the other of such elements being secured to the unsprung mass of the vehicle. A fluid is pressurized when brakes are applied to move the piston in the cylinder and pull the two masses together. The snubbing means can be a separate system or may be combined with other vehicle components, such as the master brake cylinder and the rear shock absorbers.

---

This invention relates to snubbing means for automotive vehicles, and more particularly to a means for lowering the rearward end of the sprung mass of a vehicle under conditions of forward dive, such as when brakes are applied.

In the design, manufacture and operation of automotive vehicles, the vehicle body is normally spring supported from an assembly including a frame, axles and road wheels. It is usually the case that when brakes are applied to stop the vehicle, the forward end of the vehicle body, due to its weight and forward momentum, tends to dive, or compress the springs at the front of the vehicle, and approach the ground or road surface on which the vehicle is travelling. This causes an apparent raising of the rear end of the vehicle body, thus taking considerable weight from the unsprung frame and axle assembly and creating control and skid problems in the operation of the vehicle.

Numerous devices have been available in the past to compensate for the dive of the front end of the vehicle when the brakes are applied. Such devices are generally complicated and cumbersome affairs and usually consist of complete suspension and spring systems for the vehicle. As such, these presently available systems require a great number of parts and a complex fluid or air system to accomplish the desired result. A number of known devices and systems are directed to overcoming the dive tendency by forcing the forward end of the vehicle upwardly, against the force of the forward momentum and inertia upon brake application, greatly decreasing the control of the operator over the vehicle during braking. Known devices are extremely expensive to manufacture, produce and combine with presently existing motor vehicles, and thus have found little use.

The snubbing means in which this invention is embodied comprises, generally, a fluid filled cylinder and piston arrangement connected in the rearward portion of the vehicle, one element being connected in the sprung mass of the vehicle and the other being connected in the unsprung mass of the vehicle. Fluid pressure means are connected to the brake system in such a way that, when the brakes are applied and the forward end of the vehicle dives, the fluid will be pressurized and the rearward portion of the vehicle body will be drawn down by the fluid pressure against the piston. This will cause the sprung mass of the vehicle to maintain its level position, thus maintaining a better control over the vehicle during the braking operation. The piston and cylinder arrangement may be a separate system in and of itself, may be connected to a master brake cylinder, an hydraulic pump in the power steering system, or any other source of fluid in the vehicle. On the other hand, the snubbing means may be combined with presently existing components of the vehicle, such as the rear shock absorbers, to accomplish the desired function.

Such means are relatively simple and economical, as compared to presently available devices, and provide a positive action to snub the rearward end of the vehicle under braking conditions. Being combinable with other components of the vehicle permits addition of the snubbing means to presently existing vehicles without complete restructuring and replacement of the vehicle suspension system, and provides a system of relatively low cost and ease of assembly. Better vehicle control is maintained under conditions of braking operation, thus creating a safer vehicle.

These and other advantages will become more apparent from the following description used to illustrate a preferred embodiment of the invention, when taken with the accompanying drawing in which:

FIG. 1 is a schematic view of an automotive vehicle illustrating the action of the vehicle under braking operation;

FIG. 2 is an enlarged cross-sectional view of the normal vehicle shock absorber with the snubbing means embodying the invention combined therewith; and FIG. 3 is a view similar to FIG. 2 showing a modification of the structure illustrated in FIG. 2.

Referring more particularly to the drawing, where the showings are for the purpose of illustrating a preferred embodiment of the invention only and not for the purpose of limiting same, reference is first to be had to FIG. 1, illustrating schematically a typical motor vehicle, indicated generally by the number 10, adapted to travel on a road surface, indicated generally by the numeral 12. In the well-known manner vehicle 10 has an unsprung mass, which includes the road wheels 14, wheel supporting axle assemblies and the vehicle frame. The vehicle has what is called a sprung mass, which includes the body portion mounted on springs which are in turn supported on the unsprung mass. Such springs prevent road bumps and irregularities from being transmitted to the body portion, and thus to the occupants of the vehicle. The center of mass of the vehicle 10 may be taken as being somewhere in the neighborhood of the point 16, and it will be apparent that when brakes are applied, normally at the front wheels, the forward momentum of the vehicle will cause the forward end to dive downwardly, as in the direction of arrow 17. The center of mass tends to travel in the direction of arrow 18 and the rear end of the vehicle either raises slightly, as indicated by arrow 19, or maintains the same elevation. In any event, the movement of the forward end tends to take some of the weight of the vehicle from the rearward road wheels, creating definite control problems for the vehicle, increasing the possibilities of skidding and the like, as the brakes are applied. The present invention is directed to overcoming this problem by maintaining the vehicle body in a relatively level position and thus maintaining the weight distribution on the road wheels.

Shock absorbers are normally disposed in the rearward portion of the vehicle 10, to extend between the vehicle frame and the vehicle body. The basic purpose of the shock absorbers is to control the movement of the sprung mass relative to the unsprung mass and avoid radical or sharp movement of one relative to the other. With reference now to FIG. 2, a typical vehicle shock absorber is illustrated, and with which the concept embodying the present invention is combined. The shock absorber includes a mounting ring 20, adapted to be secured to the vehicle frame or unsprung mass in any suitable manner. Extending upwardly from the mounting ring 20 is an outer cylinder 22, secured at its lower end in a cup-shaped member 24 and integrally formed from the mounting ring 20. Upwardly of the cylinder 22 is a second cup-shaped member 26 which closes the cylinder 22 as indicated. Disposed within the cylinder 22, and annularly inwardly spaced therefrom, is a second cylinder 28 supported within the cylinder 22 at the lower end by a compression valve assembly, indicated generally by the numeral 30, and maintained in the upper end of the outer cylinder 22 by a space member 32.

Extending into the inner cylinder 28, through the cup-shaped member 26 and the supporting member 32, is a piston rod member, indicated generally by the numeral 34, the upper end of which is formed into a mounting ring 36 for securement to the vehicle body or sprung mass in any suitable manner. At the lower end of the piston rod member 34 is a piston assembly, indicated generally by the numeral 38, which is reciprocable in the inner cylinder 28 for purposes to become hereinafter more apparent. A suitable oil seal 40 and supporting spring assembly 42 surrounds the piston rod member 34 and prevents any fluid leakage therepast from within the cylinder.

Piston assembly 38 is mounted on the threaded lower end 44 of the piston rod member 34, and includes a piston skirt 46 having spaced annular rings of openings 48 and 50 formed vertically therethrough. An upper control valve assembly 52 controls fluid flow through the outer annulus of rings 48, and a lower valve assembly 54 controls fluid flow through the inner annulus of holes 50. A suitable spring and retainer assembly 56 maintains the valve assemblies 52 and 54 in proper orientation and engagement, the entire piston assembly being held in place on the piston rod member 34 by the threaded collar 58, suitably mounted on the piston rod member 34.

Referring now to the compression valve assembly 30, which is provided with an annular ring of apertures 60 extending vertically therethrough, the flow through the aperture 60 is controlled by valve assembly 62. A control opening 64 receives a poppet valve member 66, supported by spring 68, to control flow through the central portion of the compression valve assembly 30. In the cup-shaped member 34 are a plurality of radial grooves 70 and passages 72, providing communication between the poppet valve chamber 73 and the annular space between the outer cylinder 22 and the inner cylinder 28.

Also mounted in the vehicle 10 is a braking system which is actuatable by the vehicle operator to stop the vehicle at any desired moment. As shown schematically in FIG. 2, the braking system includes a master brake cylinder, indicated generally by the numeral 74 and shown for convenience to be merely a cylinder 76 having a piston 78 reciprocably mounted therein. A piston rod 80 is shown to extend upwardly for engagement with a brake pedal 82, indicating that when the brake pedal 82 is depressed, the piston 78 will travel in the cylinder 76 to pressurize the fluid in the cylinder 76 and a conduit 84 extending to the front wheel brake system. A second conduit 86 extends from the cylinder 76 and, through a coupling member indicated generally by the numeral 88, is secured to a threaded nipple 90 that is received in the shock absorber assembly and maintained therein by a nut 92 secured to the outer wall of the cylinder 22 in any suitable manner. Nipple 90 extends through the outer cylinder 22 and through the inner cylinder 28 to communicate with the chamber located above the piston assembly 38.

In the normal operation of the vehicle 10 and the shock absorber assembly indicated in FIG. 2, the shock absorber will extend or compress with variations in the road surface; that is, the piston assembly 38 and the piston rod member 34 will move upwardly on extension and downwardly on compression, as the road wheels encounter obstacles or dips in the road surface. When the shock absorber is extended, fluid in the upper chamber above the piston assembly 38, known as the rebound chamber and indicated by the numeral 94, will be forced through the inner annulus of passages 50 in the piston skirt 46, through the control valve 54 and into the lower chamber known as the compression chamber and indicated by the numeral 96. Since the piston assembly 38 is being drawn upwardly, sufficient fluid to displace the volume of the piston assembly is drawn from the annular chamber 98, commonly called the reserve chamber, between the outer cylinder 22 and the inner cylinder 28, through the compression valve assembly 30 and into the compression chamber 96. During the extension cycle, the resistance to movement of the piston assembly 38 and the piston rod member 34 is governed by the setting of the control valve 54.

Upon compression of the shock absorber assembly, the fluid in the compression chamber is forced upwardly through the outer annulus of passages 48 in the piston skirt 46 to lift the control valve 52 and permit the fluid to pass to the rebound chamber 94. The fluid that is displaced by the piston assembly 38 as it travels into the compression chamber 96 is forced through the poppet valve 66 in the compression valve assembly 30 and through the passages 70 and 72 to the reserve chamber 98 between the two cylinders. The control, or resistance to movement, of the piston assembly 38 during this portion of the cycle is regulated by the compression valve assembly 30.

The foregoing operations are typical of a shock absorber during the normal operation of the vehicle. During such operation it is assumed that the brake system is not used, and the piston 78 maintains its position within the cylinder 76 so that the snubbing means is, up to this point, not in operation.

Assuming, now, normal operation of the vehicle and the shock absorber assembly, and assuming that the vehicle operator actuates the brake system by depressing the brake pedal 82, it will be apparent that the piston 78 will be moved downwardly in the cylinder 76 to pressurize fluid through the conduit 84 to the brake system. At the same time, fluid will be pressurized through the conduit 86, through the nipple 90, and in the rebound chamber 94 of the shock absorber assembly. Such action will cause immediate depression of the piston assembly 38 in the piston rod member 34, driving the piston into the compression chamber 96. This will cause fluid flow through the compression valve assembly 30, and fluid from the compression chamber will be conveyed into the reserve chamber 98 between the two cylinders 22 and 28. Such action causes the piston rod member 34 to move toward the mounting 20, and thus pulls the sprung mass of the vehicle toward the unsprung mass of the vehicle. This movement counteracts the forward dive of the front of the vehicle as the brakes are applied. Such actuation tends to maintain the level position of the vehicle sprung mass and assists in maintaining control over the rearward portion of the vehicle as the brakes are applied. Upon movement of the brake pedal 82 back to its original position; that is, when the brakes are relieved by the operator, the pressure will be removed in cylinder 76 and the piston 78 will move upwardly in the brake cylinder 76. In the shock absorber, the piston assembly 38 and piston rod member 34 return to their normal positions, the displaced fluid in the reserve chamber 98 passing into the compression chamber through the passages 60 in the compression valve assembly 30. The system is thus returned to normal with the shock absorber assembly continuing to carry out its normal function.

With reference now to FIG. 3, wherein another preferred embodiment of the invention is illustrated, the shock absorber structure is the same as heretofore described with respect to FIG. 2, and there is added thereto a second conduit 100 secured in the outer cylinder 22 in any suitable manner, as by a nut 102. Conduit 100 leads to a fluid reservoir 104 for receiving fluid from the reserve chamber 98 with fluid flow from the compression chamber 96. In situations where the capacity of the system would require more volume than is available in the reserve chamber 98 for the actuation of the snubbing means, and where fluid is added to the shock absorber assembly as a result of the operation thereof, the reservoir 104 conveniently receives such excess fluid through the conduit 100 for displacement of the piston assembly 38 and the fluid displaced thereby.

Although the foregoing description has related the snubbing means of the present invention to combination with the shock absorber of a vehicle, it will now be apparent that the snubbing means could be incorporated as a separate system. For example, instead of utilizing the piston and cylinder of the shock absorber illustrated in the drawing, such structure could be replaced by a separate and independent piston and cylinder arrangement, mounted in substantially the same manner to the sprung and unsprung masses of the vehicle. Further, instead of using the master brake cylinder as the fluid pressure source, some other fluid source could be used, either another normal vehicle component such as the power steering system, or a self-contained fluid supply and pressurizing means solely for the snubbing operation.

Thus, a snubbing means is provided which is easily combined with present components of a motor vehicle and which, when actuated, serves to counteract the normal forward dive of the vehicle when the braking system is applied. Such snubbing means are extremely simple to manufacture and operate and are extremely economical in requiring few parts and inexpensive installation. The overall result is motor vehicle operation that is much safer since control is maintained over the reaward portion of the vehicle during the braking operation, and because of a positively acting system.

The present invention has been described in connection with certain structural embodiments; however, it is to be appreciated that various changes may be made in the structural embodiments without departing from the intended spirit and scope of the present invention as defined by the appended claims.

Having thus described the invention, I claim:

1. Snubbing means for an automotive vehicle having a sprung mass and an unsprung mass and a braking system including a brake cylinder and comprising:
   a fluid filled cylinder adapted to be secured to either one of the sprung mass or the unsprung mass of the vehicle at the opposite end of said vehicle from the application of brakes on said vehicle;
   a piston reciprocable in said cylinder and dividing said cylinder into two fluid containing chambers;
   control valve means in said cylinder for permitting fluid flow from one of said chambers when the other of said chambers is pressurized;
   a piston rod extending from said piston and adapted to be secured to the other of the sprung mass or the unsprung mass of said vehicle;
   and means operatively connected to said braking system for supplying fluid under pressure to said cylinder and on one side of said piston to move said piston in said cylinder for moving said sprung mass toward said unsprung mass in coordination with actuation of said braking system.

2. The snubbing means set forth in claim 1 wherein said means for supplying fluid under pressure includes a fluid source, means for pressurizing said fluid source in coordination with actuation of said braking system, and a conduit extending from said fluid source to said cylinder to provide communication between said fluid source and said cylinder.

3. The snubbing means set forth in claim 2 wherein said fluid source is a brake cylinder in said braking system.

4. In combination with a shock absorber in an automotive vehicle having a brake system, said shock absorber including a fluid filled cylinder secured to the unsprung mass of said vehicle and a piston reciprocably mounted in said cylinder and secured to the sprung mass of said vehicle and dividing said cylinder into a rebound chamber on the sprung mass side of said piston and a compression chamber on the unsprung mass side of said piston, snubbing means comprising a fluid containing reservoir, a conduit extending from said fluid containing reservoir to said rebound chamber in said cylinder and communicating therebetween, and means operatively connected to said brake system for pressurizing the fluid in said reservoir and in said conduit and in said rebound chamber to move said piston in said cylinder and draw said sprung mass toward said unsprung mass when said brake system is actuated.

5. The combination set forth in claim 4 wherein said shock absorber further includes a reserve chamber communicating through valve means with said compression chamber in said cylinder, and said snubbing means further includes a second fluid reservoir having a conduit communicating with said reserve chamber, said second reservoir receiving excess fluid from said reserve chamber when said piston is moved into said compression chamber.

References Cited

UNITED STATES PATENTS 2,918,306  12/1959  Lewandoski.
2,918,305  12/1959  Faiver.
2,845,280  7/1958  Krotz.

PHILIP GOODMAN, Primary Examiner

U.S. Cl. X.R.

280—124